US008132093B2

(12) United States Patent
Lammel et al.

(10) Patent No.: US 8,132,093 B2
(45) Date of Patent: Mar. 6, 2012

(54) INSTANCE ANNOTATION IN OBJECT-ORIENTED PROGRAMMING

(75) Inventors: Ralf Lammel, Redmond, WA (US); Anders Hejlsberg, Seattle, WA (US); Andrew E. Kimball, Sammamish, WA (US); David Lawrence Remy, Mercer Island, WA (US); Erik Meijer, Mercer Island, WA (US)

(73) Assignee: Microsoft Corporation, Redmond, WA (US)

( * ) Notice: Subject to any disclaimer, the term of this patent is extended or adjusted under 35 U.S.C. 154(b) by 1356 days.

(21) Appl. No.: 11/504,513

(22) Filed: Aug. 14, 2006

(65) Prior Publication Data
US 2008/0040656 A1    Feb. 14, 2008

(51) Int. Cl.
*G06F 17/00*    (2006.01)
(52) U.S. Cl. .................................................. 715/230
(58) Field of Classification Search ........... 715/230–233
See application file for complete search history.

(56) References Cited

U.S. PATENT DOCUMENTS

| | | | | |
|---|---|---|---|---|
| 5,943,497 | A * | 8/1999 | Bohrer et al. | 717/121 |
| 5,970,490 | A | 10/1999 | Morgenstern | 707/10 |
| 6,158,044 | A | 12/2000 | Tibbetts | 717/1 |
| 6,381,743 | B1 * | 4/2002 | Mutschler, III | 717/104 |
| 6,449,659 | B1 * | 9/2002 | Caron et al. | 719/315 |
| 6,513,152 | B1 * | 1/2003 | Branson et al. | 717/100 |
| 6,549,922 | B1 | 4/2003 | Srivastava et al. | 707/205 |
| 6,898,604 | B1 | 5/2005 | Ballinger et al. | 707/101 |
| 6,957,228 | B1 * | 10/2005 | Graser | 707/103 R |
| 6,973,460 | B1 | 12/2005 | Mitra | 707/103 R |
| 6,976,029 | B2 | 12/2005 | Venkatesh et al. | 707/102 |
| 2002/0129330 | A1 * | 9/2002 | Shiu | 717/104 |
| 2002/0133806 | A1 * | 9/2002 | Flanagan et al. | 717/123 |
| 2002/0161777 | A1 * | 10/2002 | Smialek | 707/102 |
| 2003/0074648 | A1 * | 4/2003 | Brassard et al. | 717/104 |

(Continued)

OTHER PUBLICATIONS

Fandrich et al., Declaring and Checking Non-null Types in an Object Oriented Language, Oct. 26-30, 2003, ACM OOPSLA '03, pp. 302-312.*

(Continued)

*Primary Examiner* — Laurie Ries
*Assistant Examiner* — Frank D Mills
(74) *Attorney, Agent, or Firm* — Woodcock Washburn LLP

(57) ABSTRACT

Object instance annotation technology is disclosed. This technology is capable of annotating any number of instances for any number of objects. Object instance annotations can be of various types, and annotations can serve as data extensions. Objects are enabled for annotation either by developers, or, alternatively, automatically by a programming language or framework. Furthermore, an interface is provided for annotations. This interface has a variety of operations, some of which allow for adding, retrieving, or removing annotations. Annotations can be reference types or even value types. They may also be private class types. Once object instances are enabled for annotating, and the interface is set up, this interface can annotate a multitude of different kinds of objects. For example, it can annotate generic objects, XML trees, CodeDom trees, and so on.

19 Claims, 15 Drawing Sheets

U.S. PATENT DOCUMENTS

| | | | |
|---|---|---|---|
| 2003/0120678 A1* | 6/2003 | Hill et al. | 707/102 |
| 2003/0200533 A1* | 10/2003 | Roberts et al. | 717/124 |
| 2004/0093581 A1* | 5/2004 | Nielsen et al. | 717/101 |
| 2004/0111668 A1 | 6/2004 | Cragun et al. | 715/512 |
| 2005/0010902 A1* | 1/2005 | Takacsi-Nagy et al. | 717/114 |
| 2005/0066338 A1* | 3/2005 | Bloesch et al. | 719/328 |
| 2005/0071809 A1* | 3/2005 | Pulley | 717/108 |
| 2005/0076331 A1* | 4/2005 | Das et al. | 717/114 |
| 2005/0091230 A1* | 4/2005 | Ebbo et al. | 707/100 |
| 2005/0091405 A1 | 4/2005 | Liu et al. | 709/201 |
| 2005/0125716 A1 | 6/2005 | Cragun et al. | 715/512 |
| 2005/0198202 A1* | 9/2005 | Yamamoto | 709/218 |
| 2005/0203876 A1 | 9/2005 | Cragun et al. | 707/3 |
| 2005/0216885 A1* | 9/2005 | Ireland | 717/108 |
| 2005/0262499 A1* | 11/2005 | Read | 717/172 |
| 2006/0101376 A1* | 5/2006 | Gutz et al. | 717/104 |
| 2006/0123017 A1* | 6/2006 | Berg et al. | 707/100 |
| 2006/0123332 A1* | 6/2006 | Berg et al. | 715/512 |
| 2006/0225053 A1* | 10/2006 | Lakshman et al. | 717/140 |
| 2006/0248523 A1* | 11/2006 | Berg et al. | 717/174 |
| 2007/0150855 A1* | 6/2007 | Jeong | 717/106 |
| 2007/0234318 A1* | 10/2007 | Seto et al. | 717/140 |
| 2008/0022260 A1* | 1/2008 | Kinder et al. | 717/116 |
| 2008/0052671 A1* | 2/2008 | Plante et al. | 717/114 |

OTHER PUBLICATIONS

Flanagan et al., Houdini, an Annotation Assistant for ESC/Java, 2001, Soringer-Verlag Berlin Heidelberg, Lecture Notes in Computer Science vol. 2021, pp. 500-517.*

Palsberg et al., Object-Oriented Type Interface, 1991, ACM OOPSLA '91, pp. 146-161.*

Goldman, N.M., "Ontology-oriented programming: static typing for the inconsistent programmer," *In Lecture Notes in Computer Science: The Semantic Web—ISWC 2003*, Springer-Verlag Heidelberg, 2003, 2870, 850-865.

Palsberg, J., et al., "Object-oriented type inference," *OOPSLA*, 1991, 146-161.

Spinellis, D., et al., "Using objects for structuring multiparadigm programming environments," *J. of Object-Oriented Programming*, Mar./Apr. 1995, 8(1), 33-38.

* cited by examiner

```
// Add an annotation; use type as key
// Use annotation slot directly for first annotation.
// Coerce to an array of annotations when 2nd annotation arives.
// Throw when type of new annotation is already present.
//
public static void AddAnnotation(ref object annotations, object annotation) {
    if (annotation == null) throw new ArgumentNullException();
    Type type = annotation.GetType();
    if (annotations == null) {
        annotations =
            type != typeof(object[]) ?
                annotation
                : new object[] { annotation };
    }
    else {
        object[] a = annotations as object[];
        if (a == null) {
            if (annotations.GetType() == type)
                throw new ArgumentException(
                    "Duplicate annotation");
            annotations = new object[] { annotations, annotation };
        }
        else {
            int x = -1;
            for (int i = 0; i < a.Length; i++) {
                object o = a[i];
                if (o == null) {
                    if (x < 0) x = i;
                }
                else {
                    if (o.GetType() == type)
                        throw new ArgumentException(
                            "Duplicate annotation");
                }
            }
            if (x < 0) {
                x = a.Length;
                Array.Resize(ref a, x * 2);
                annotations = a;
            }
            a[x] = annotation;
        }
    }
}
```

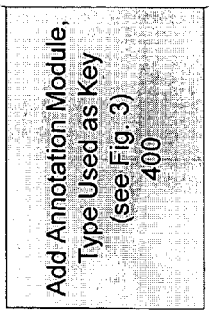

Add Annotation Module,
Type Used as Key
(see Fig. 3)
400

Fig. 4

```
// Retrieve an annotation
// Weakly typed method: use System.Type as key.
//
public static object GetAnnotation(ref object annotations, Type type) {
    if (annotations != null) {
        object[] a = annotations as object[];
        if (a == null) {
            if (annotations.GetType() == type) return annotations;
        }
        else {
            for (int i = 0; i < a.Length; i++) {
                object o = a[i];
                if (o != null && o.GetType() == type) return o;
            }
        }
    }
    return null;
}
```

Retrieve An Annotation Module,
Weakly Typed Method
(see Fig. 3)
500

Fig. 5

```
// Remove an annotation
// Weakly typed method: use System.Type as key.
//
public static void RemoveAnnotation(ref object annotations, Type type) {
    if (annotations != null) {
        object[] a = annotations as object[];
        if (a == null) {
            if (annotations.GetType() == type) annotations = null;
        }
        else {
            for (int i = 0; i < a.Length; i++) {
                object o = a[i];
                if (o != null && o.GetType() == type) {
                    a[i] = null;
                    return;
                }
            }
        }
    }
}
```

Remove An Annotation Module,
Weakly Typed Method
(see Fig. 3)
700

Fig. 7

```
public abstract class XWrapper {

// Maintain link from wrapper to XElement instance
    internal XElement xElement = null;

// Cast XElement to XWrapper subtypes
    public static T AsXWrapper<T>(XElement xe) where T : XWrapper, new() {
        if (xe == null) {
            return null;
        }

T xoSubType = xe.GetAnnotation<T>();
        if (xoSubType == null) // No association yet
        {
            xoSubType = new T();
            xoSubType.xelement = xe;
            xe.AddAnnotation(xoSubType);
        } return xoSubType;
    }

// Various omissions (unrelated to instance annotation)
    // ... code elided ....

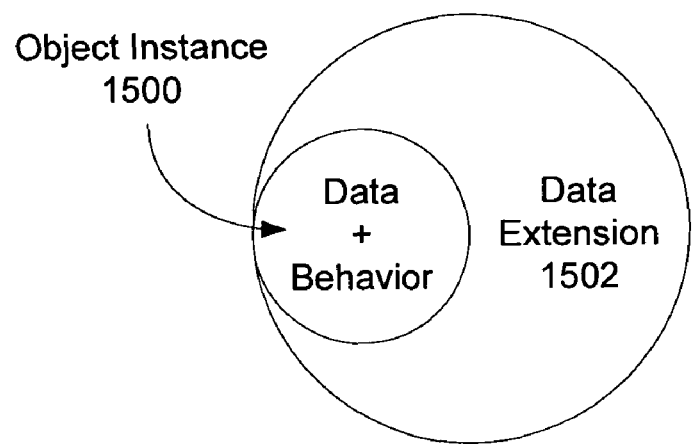
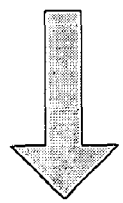
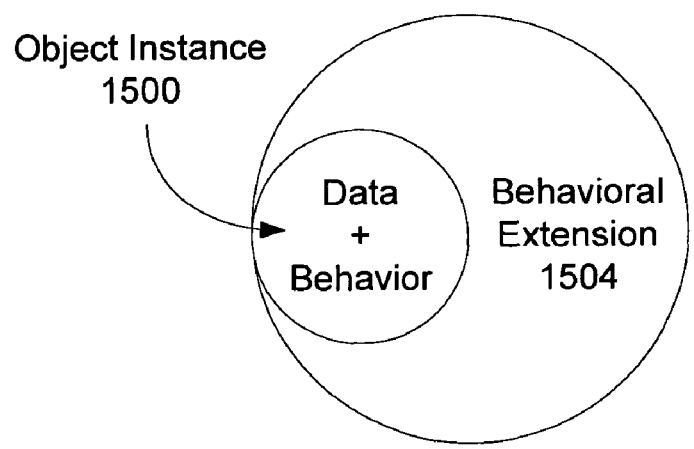
Fig. 15

# INSTANCE ANNOTATION IN OBJECT-ORIENTED PROGRAMMING

FIELD OF TECHNOLOGY

The present subject matter relates to the field of computing, and more particularly, to instance annotation in object-oriented programming, although such instance annotation corresponds to merely an exemplary and non-limiting field of the presently disclosed subject matter.

BACKGROUND

Object-oriented programming makes it difficult to extend data that is encapsulated by instances of existing classes. Whenever a certain application of a given class would require additional data, such as additional fields, the most basic solution is to engage in class inheritance so that an extended class can be provided instead. The application must then be careful about using the new subclass rather than the original base class. This may be impractical since the application has often no control over the creation of instances. Furthermore, there is a good chance that several requirements make it impossible to favor a specific subclass.

Open-class mechanisms (such as partial classes in programming frameworks or introductions in aspect-oriented programming) have been proposed to add any sort of members (including fields) to existing classes. These methods are normally restricted to design-time class extension. Those few approaches that allow for run-time class extension are again too restricted. First, these approaches tend to be restricted to dynamically typed languages. And second, they tend to allow for extra methods but not for extra fields (i.e., data).

Design patterns have been invented to remedy some of these problems. For instance, the decorator design patterns has been proposed (in various forms) to enable the decoration of existing instances by behavior and data. Also, the factory pattern has been proposed to avoid commitment to class-specific constructors in code. However, even the combination of these two patterns (and other standard design patterns) cannot provide unanticipated extension of instances by data. Moreover, the resulting designs suffer from serious limitations or defects, namely, object schizophrenia (object schizophrenia results when the state and/or behavior of what is intended to appear as a single object is actually broken-up into several objects, each of which has its own object identity). In particular, the design must be globally ruled by the sometimes inconvenient design patterns, and base objects and extended objects carry different object identities, which often leads to incorrect or inflexible solutions.

There is one known general technique for instance annotation, but it is prohibitively expensive in practice, hence it is hardly used. It may maintain a mapping from instances to annotations by means of a dictionary. The obvious problem with this approach is that the dictionary gets potentially congested, as the number of instances grows. Yet another problem with this approach is that base data and extended data are exposed in very different ways. In particular, the status of the extended data in a dictionary will be exposed to any client code that relies on the relevant objects to carry such additional data.

There are many refinements of the ideas mentioned above, but none of them satisfies a requirement for a general, efficient, non-intrusive, robust, statically type-safe, easy-to-use technique for instance annotation. Thus, to address at least the above mentioned problems, various solutions are disclosed herein.

SUMMARY

To address the above mentioned problems, object instance annotation technology is disclosed. This technology is capable of annotating any number of instances for any number of objects. Object instance annotations can be of various types, and annotations can serve as data extensions. At first, objects are enabled for annotation either by developers, or, alternatively, automatically by a programming language or framework.

Second, an interface is provided for annotations. This interface has a variety of operations, some of which allow for adding annotations, retrieving annotations, or removing annotations. Annotations can be reference types or even value types. They may also be private class types. Finally, once object instances are enabled for annotating, and the interface is set up, this interface can annotate a multitude of different kinds of objects. For example, it can annotate generic objects, XML trees, CodeDom trees, and so on.

It should be noted that this Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The foregoing Summary, as well as the following Detailed Description, is better understood when read in conjunction with the appended drawings. In order to illustrate the present disclosure, various aspects of the disclosure are shown. However, the disclosure is not limited to the specific aspects discussed. The following figures are included:

FIG. 1 provides a generalized view of instance annotation, where this view shows the relationships between objects, annotations, interfaces, and so on;

FIG. 4 illustrates an exemplary and non-limiting add annotation module where types are used as keys for adding annotations to object instances;

FIG. 5 illustrates a weakly typed scenario where annotations are retrieved by types;

FIG. 7 also shows a weakly typed scenario where annotations are removed by types;

FIG. 11 illustrates one exemplary and non-limiting coded implementation of the subject matter discussed with reference to FIG. 10;

FIG. 15 illustrates an exemplary aspect of data extension.

DETAILED DESCRIPTION

Certain specific details are set forth in this description and accompanying figures to provide a thorough understanding of various aspects of the presently disclosed subject matter. However, certain well-known details often associated with computing and software technology are not set forth in this disclosure in order to avoid unnecessarily obscuring these various aspects. Further, those of ordinary skill in the relevant art will understand that they can practice other aspects of the presently disclosed subject matter without one or more of the details described below. Finally, while various methods are described with reference to steps and sequences in this description, the description as such is for providing a clear implementation of the aforementioned aspects, and the steps and sequences of steps should not be taken as required to practice this subject matter.

Aspects of Instance Annotation in Object-Oriented Programming

The terminology used herein is well understood in the art of computing. For example, some computer programming languages, such as C#, divide types into reference types and value types. Value types are stored directly on the stack. Thus, a value type such as an "int" has its value, say, "13", stored on the stack. In contrast, reference types consist of two parts. First, a reference or handle is stored on the stack; and second, data is stored on the heap (sometimes called a managed heap). The reference on the stack contains the address of the data on the heap (it is a pointer to the data).

By way of another example, strongly typed variants are discussed herein, and such variants refer to programming language aspects that require the types to be explicitly stated. For instance, C is a strongly typed language, since it requires declaration of the type of data. In contrast, a programming language such as Perl is loosely typed, and hence there is no need to declare variable types before using them. These and other such terms of art used herein are well understood in the art and take their ordinary meaning in the art, unless otherwise indicated.

Figure 1:
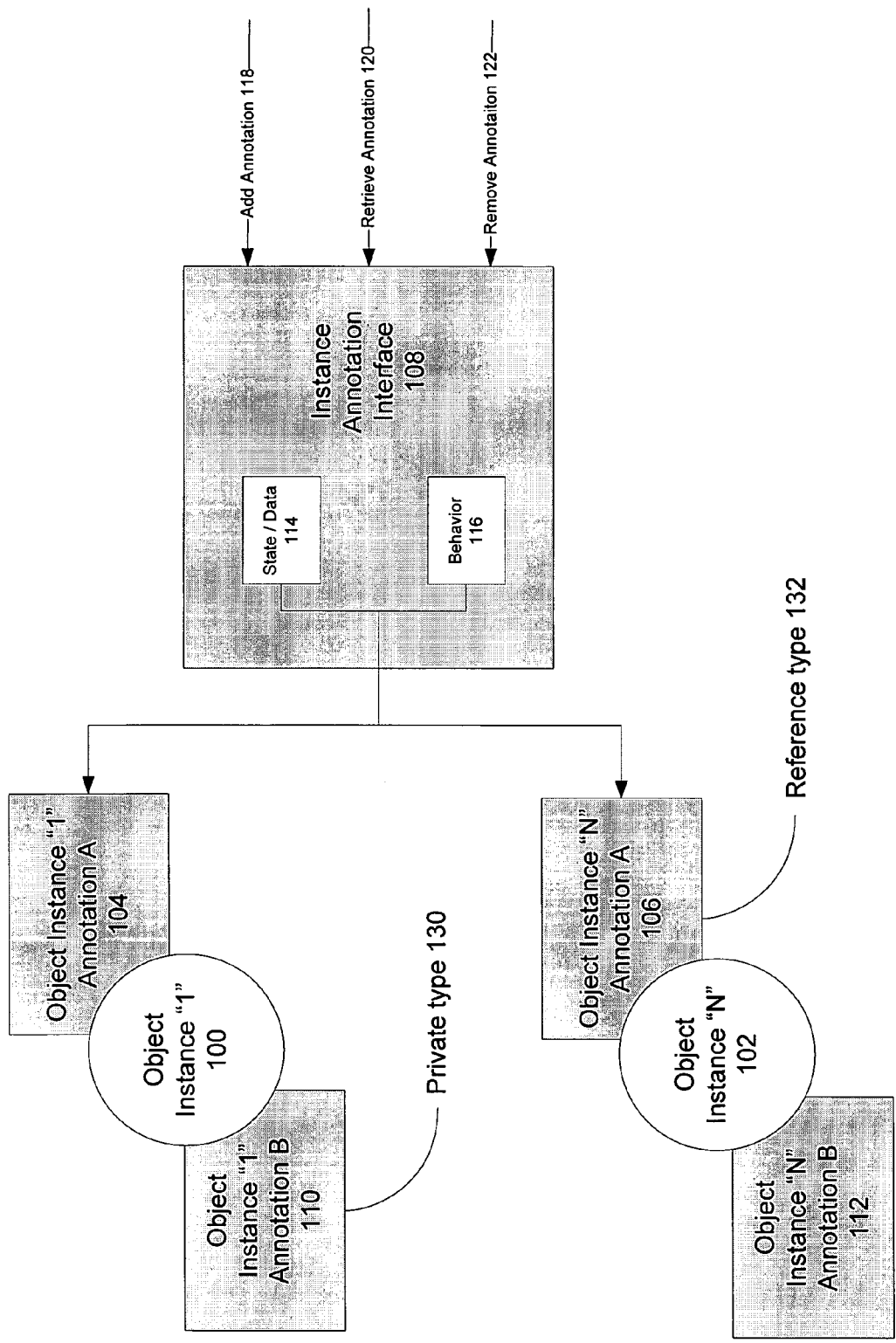

In one aspect of the presently disclosed subject matter, FIG. 1 provides a generalized view of instance annotation, where this view shows the relationships between objects, annotations, interfaces, and so on. As is well known in the art, an object may have a plurality of instances. In general terms, an object comprises of data and behavior information; fields are examples of data information; methods are examples of behavioral information. In one aspect, behavior information may be based on data information, and so any data annotation naturally extends any behavioral annotation.

One example of an object may be a class (although it is certainly not limited to classes). Thus, per FIG. 1, a first object instance, object instance "1" 100 is shown, and a second object instance, object instance "N" 102 is shown (where "N" stands for some other numbered object instance). Object instance "1" 100 has two annotations: Object instance "1" annotation A 104 and annotation B 110. Each of these annotations 104, 110 is an annotation of a different value type (types may be "ints," "doubles," "floats," or any class defined type). Thus, in FIG. 1, each annotation assigned to a particular instance of an object is type distinct.

Similarly, object instance "N" 102 also has two annotations: annotation A 106 and annotation B 112. While annotation A 106 is distinct in type from annotation B 112, annotation A 104 of object instance "1" 100 may be identical to annotation A 106 of object instance "N". As mentioned, each object instance 100, 102 may have a plurality of distinct annotations, but annotations of the same type may appear across a plurality of object instances.

Such annotations 104, 110, 106, 112 may comprise of at least of two distinct types of information: state or data information 114 or behavioral or functional information 116. Put generally, each annotation can annotate behavior 116 and data 114. This type of information can be provided to such annotations via a instance annotation interface 108. This interface 108 allows users or modules to annotate object instances in a variety of ways (it should be kept in mind that such annotation is allowed on a per instance basis instead of just on a type basis—the notion of inheritance, for example, can merely expand every instance at the same time, and not allow such per instance precise annotation).

The interface 108 allows for annotation by addition some annotation 118, retrieving some annotation 120, or removing some annotation 122. For example, an annotation (whether a state or behavior annotation) can be first added 118, then later it can be retrieved 120, and then later still it can be removed 122. These three functionalities of the interface 108 are merely exemplary and not limiting. Other kinds of functionalities, as those of skill in the art will readily appreciate, can be added that allow for data and behavioral manipulation.

Figure 2:
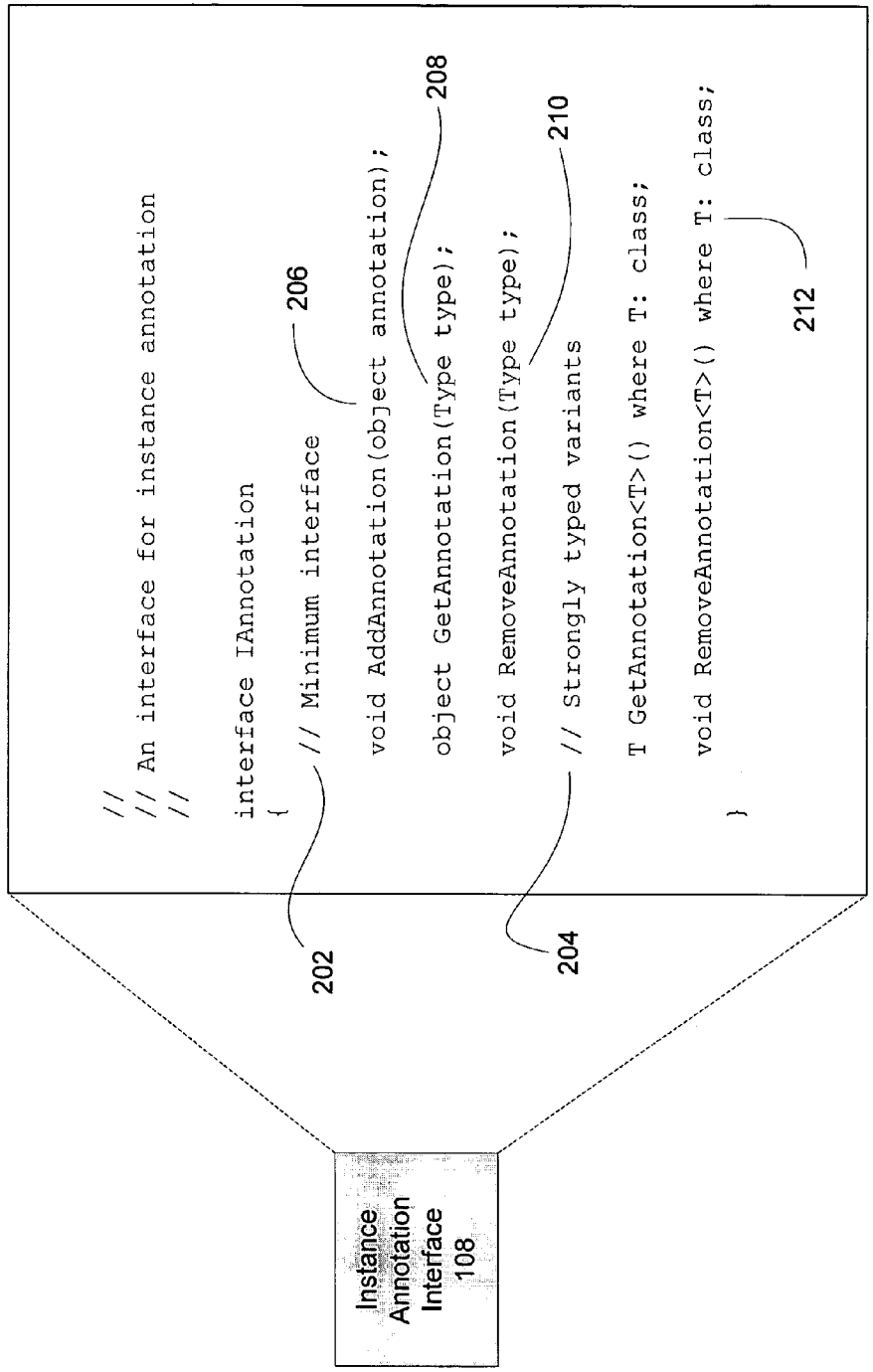
FIG. 2 illustrates one of such interfaces, namely, an instance annotation interface, showing in detail add, retrieve, and remove functionalities.

FIG. 2 provides a more detailed look at the instance annotation interface 108, showing in detail the mentioned add, retrieve, and remove functionalities. First, a minimum or default interface 202 is provided for these three functionalities. The add annotation functionality may take in an annotation of object type—this means that any type can be added to annotate an object instance.

In contrast, for the retrieve functionality, namely, "GetAnnotation", a type is stated as a type parameter, since the type serves as the key for identifying the relevant annotation. Thus, an annotation can be retrieved that is, for example, of an "Address" type (where this type may have the street address, zip code, city, etc.). Similarly, the type is stated as a type parameter for the remove functionality, since, again, the type serves as the key for identifying which type of annotation will be removed. This notion is shown in FIG. 2 by having "object annotation" input 206 in the "AddAnnotation" function, and in contrast by having a "Type type" input/output 208, 210 in the "GetAnnotation" and "RemoveAnnotation" functions.

Second, in addition to the minimum interface 202, functions can be provided for strongly typed variants 204 (per the discussion above). Here, the "RemoveAnnotation" has a generic type parameter T 212.

As mentioned, an annotation enabled instance can hold multiple annotations, as long as their types are distinct. Thus, trying to add an annotation of a given type to an instance that already holds an annotation of the given type may result in an exception. While multiple annotations of the same type may be useful, this leads to ambiguities and extra complexities. It is difficult to know, in such an instance, whether multiple annotations were intended or whether this was actually a symptom of interference between different parts of an application that just happened to facilitate the same annotation type (with potentially different intentions). The fact that the shown interface 108 maintains distinct types per object instance obviates using a complex interface. In any case, one can use collection types as the annotation types to address collection-like behavior.

The types that are added using the interface 108 are preferably reference types (as opposed to value types). FIG. 1 shows that object instance "N" Annotation A 106 is such a reference type 132. The other annotations 104, 110, 112 may also be reference types (although a mixed scenario of value and reference types is also contemplated by the present disclosure). And yet, while value types can be used, the illustrated interface 108 preferably uses reference types because value types offer very little nominal protection against interfering uses of the same annotation type by several application parts with different intents of annotation (as discussed above).

Even with arbitrary nominal types such as reference types, there is no guarantee that several application parts will avoid using the same annotation type. The interfering use of the same annotation type could have dramatic and drastic consequences. One part of an application may win the race of annotating an instance, while another part of the application may incorrectly use that annotation. Furthermore, another potential misbehavior is that both parts of the applications may attempt annotation, which could lead to a runtime error.

In order to remedy this situation, in another aspect of the presently disclosed subject matter, local or private classes are used as annotation types. Turning back to FIG. 1, it is shown that the object instance "1" annotation B 110 is of a private type 130 (the same holds true for all the other illustrated annotations 104, 106, 112). This makes it possible to effectively shield some component that uses annotations against all other such components.

Next, subtyping may also affect how instances are annotated. In one aspect, subtyping can be handled such that when an annotation is retrieved, for example, the precise type should be provided as the key. In other words, using an ancestor type of the intended annotation is disallowed. In another aspect, ancestor types can be accepted by the interface when retrieving an annotation. In this case, an actual annotation is selected by any of its ancestor subtypes. Once such subtyping is used, however, multiple annotations can possibly share a common ancestor type, and this leads to various kinds of ambiguities.

However, any ambiguities can be handled in a variety of ways. For example, during an add operation, annotations may be disallowed if such annotations share an ancestor type other than type. Also, during retrieval, information may not be retrieved if the given key is the ancestor type of several annotations. If subtyping is used for annotation, an extra level of redirection can be used (using an extra strong wrapper for subtyping-aware-annotations).

Figure 3:
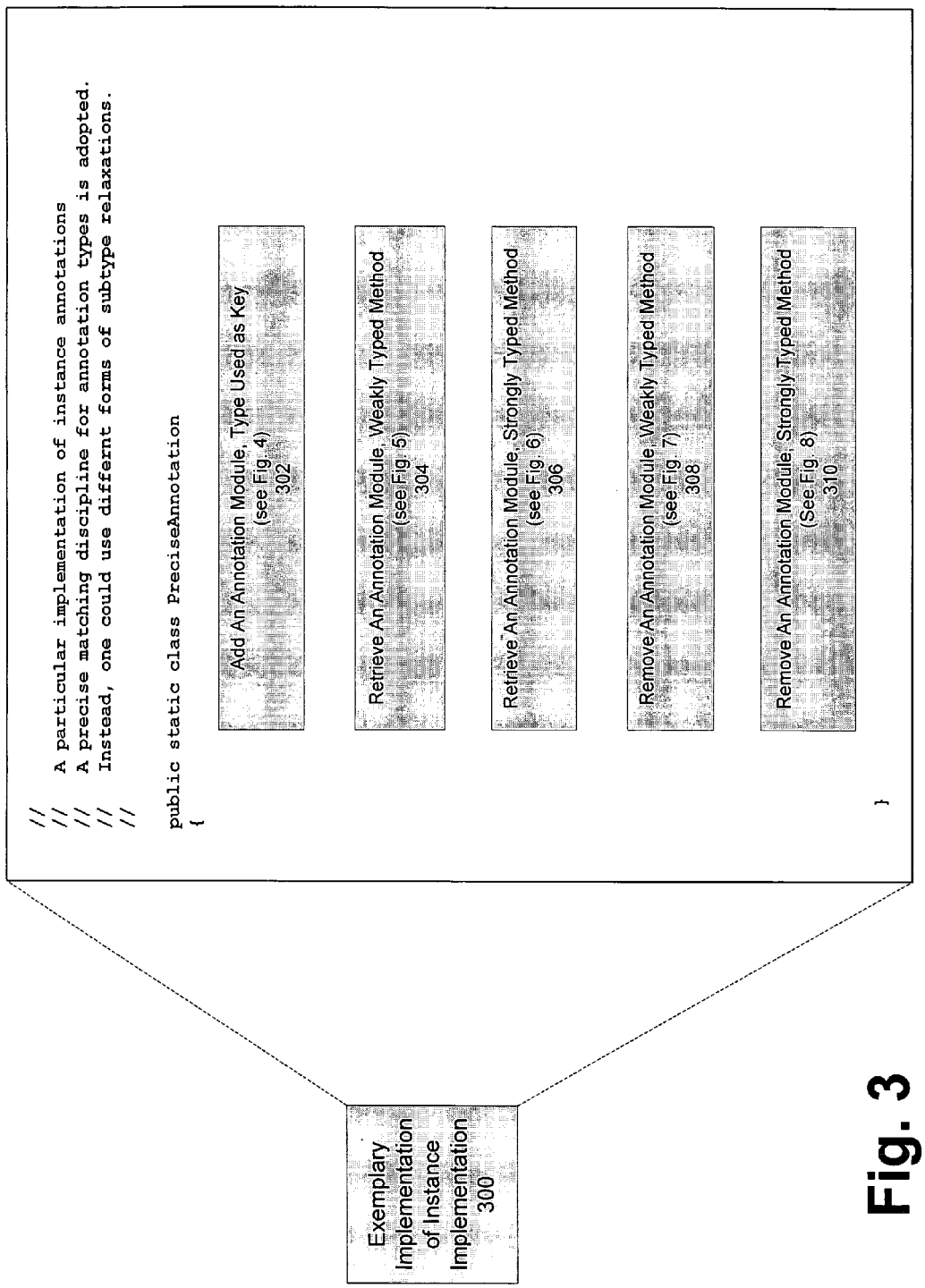
FIG. 3 illustrates an exemplary and non-limiting reference implementation, where a static class is provided whose static methods implement the above discussed annotation interface.

In another aspect of the presently disclosed subject matter, FIG. 3 illustrates an exemplary and non-limiting reference implementation 300, where a static class is provided whose static methods implement the above discussed annotation interface. In FIG. 3, a public static class "PreciseAnnotation" is shown, and it comprises of five modules: an add annotation module 302; a retrieve annotation module using weakly typed methods 304 that use a type as a key; another retrieve annotation module 306, this time for strongly typed methods, where it uses generic parameters as keys; a remove annotation module for weakly typed methods 308 using types as keys; and, another remove annotation module for strongly typed methods 310 that use generic parameters as keys. These five modules are illustrated in and described with reference to FIGS. 4, 5, 6, 7, and 8, respectively.

Thus, FIG. 4 illustrates an exemplary and non-limiting add annotation module where types are used as keys for adding annotations to object instances. Examining the code, it is clear that if a user or some other module interacting with the add annotation module 400 wants to add an annotation, "type" is used to add such an annotation. Specifically, if it is not the case that "annotation==null" (i.e. there is some annotation content to be added), then "object [ ] a=annotations as object [ ]" (this annotation content is added). In this case, the annotation can be a new annotation ("a==null") or it can be an additional annotation ("else . . . "). If this additional annotation is a duplicate annotation, an exception is thrown. This is but a cursory review of this exemplary implementation; those of skill in the art will appreciate similar and equivalent implementations that can be embodied per the present disclosure.

FIG. 5 illustrates that similarly to FIG. 4, in the weakly typed scenario, types are used as keys for retrieval. The "GetAnnotation" class has an "object" annotations parameter for outputting the results of a retrieve operation, and an input "Type" type parameter to specify the annotation type to retrieve. Thus, if an annotation is not an empty set ("if (annotations !=null)"), "annotations" are returned. The "type" is the key or means for retrieving the desired "annotations".

Figure 6:
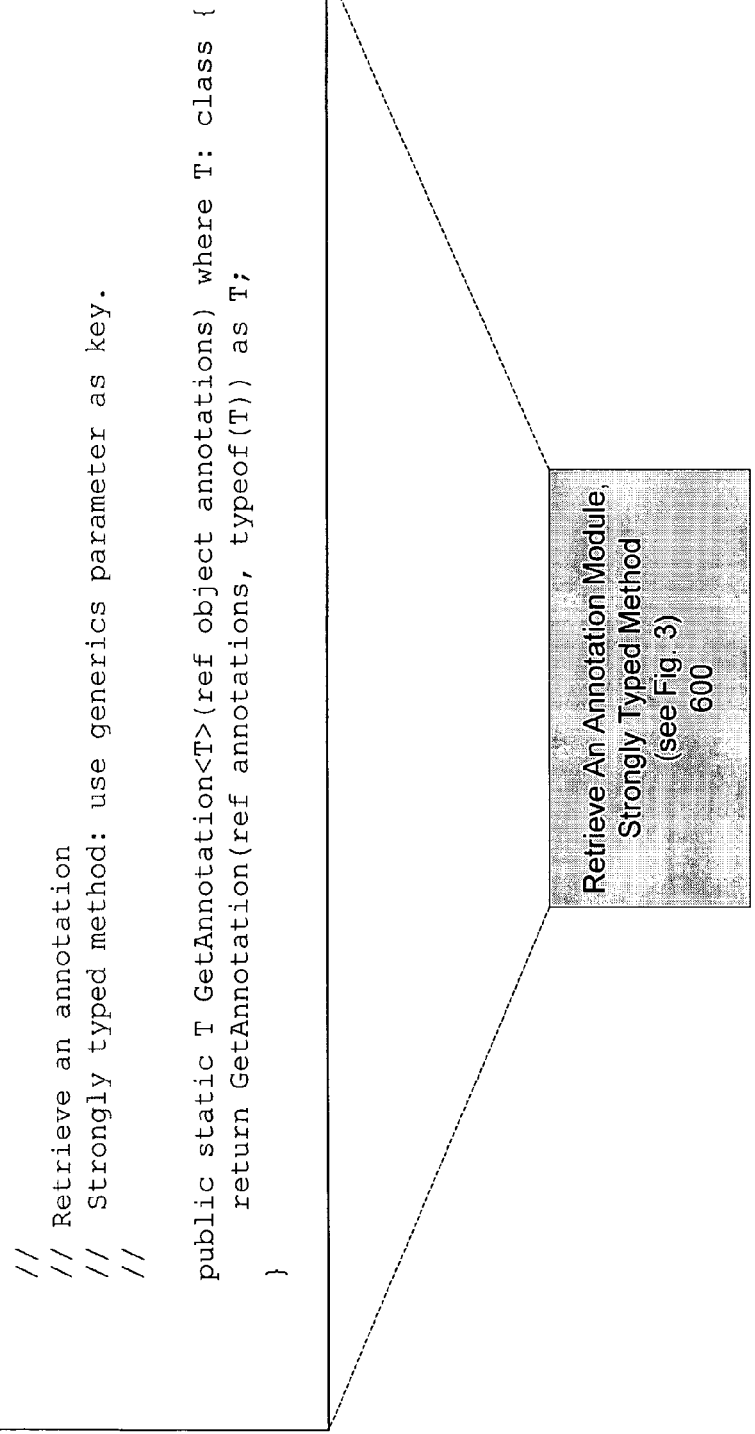
FIG. 6 illustrates a strongly typed scenario where annotations are retrieved by types.
Figure 8:
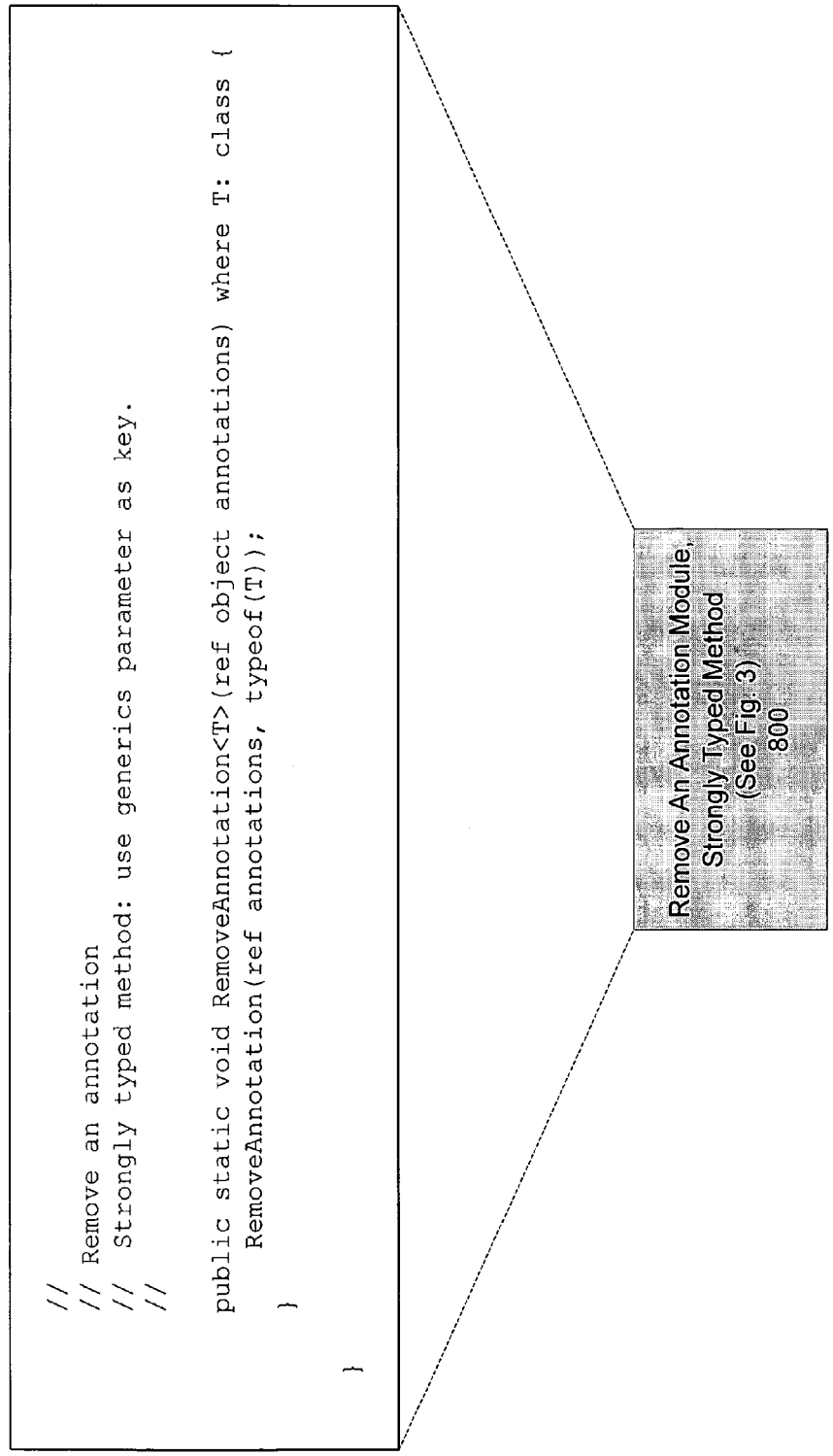
FIG. 8 shows a strongly typed scenario where annotations are removed by types.

In a similar vein, FIG. 6 illustrates retrieval of annotations in the strongly typed scenario. A class "GetAnnotations" returns "annotations" where a generic parameter "T" enforces certain constraints. The generic type parameter may be used for convenience. The code uses the type parameter T to create the second argument to the untyped GetAnnotation method, and also uses it to cast the result into a type T (or null if the cast fails) via the as operator.

It is apparent that the explanations and descriptions given for FIG. 5 (weakly typed retrieve) and FIG. 6 (strongly typed retrieve) hold similarly true for FIGS. 7 (weakly typed remove) and 8 (strongly typed remove). Thus any further discussion of these figures is omitted, (since such explanations and descriptions are apparent and would otherwise be redundant) other than to point out that FIG. 7 removes annotations by Type "types" and FIG. 8 removes annotations by object "annotations" as constrained by the generic parameter T.

Figure 9:
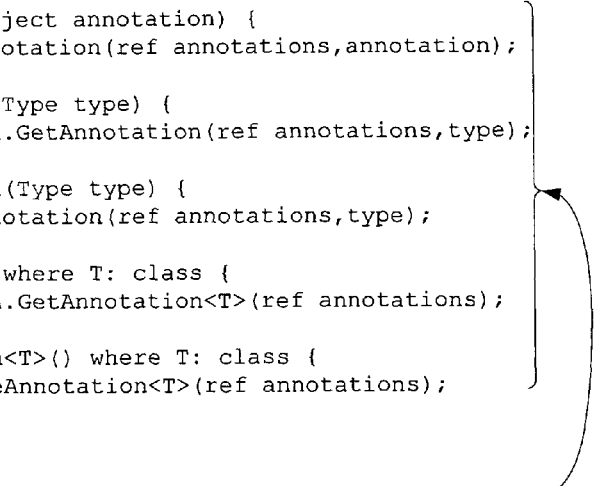
FIG. 9 illustrates a sample class that is enabled for instance annotation.

In another aspect of the presently disclosed subject matter, FIG. 9 illustrates a sample class that is enabled for instance annotation. An exemplary class, "Foo", is enabled for annotation 900 by the statement "internal object annotations;". In the illustrated scenario, such enablement is provided by some agent, such as a developer. However, alternatively, such annotation enablement may just as easily be performed by other agents—namely, it can be performed automatically by a programming language that supports annotation enabled object types. Thus, in this latter scenario, developers or computer programmers would not have to explicitly enable annotation 900, but rather such enablement could be provided implicitly (automatically) behind the scenes. Whether the enabling agent is a developer (or a user of a system implementing the present subject matter), or an automatic process associated with a programming language associated with such a system, will depend on the design context of the presently disclosed subject matter.

FIG. 9 also declares the five functionalities 902 discussed above: adding annotation, retrieving annotation (for the weakly typed scenario and the strongly typed scenario), and removing annotation (for the weakly typed scenario and the strongly typed scenario). As mentioned, these are merely exemplary functionalities, and other kinds could also be used that would help with object instance annotation.

Strongly Typed Wrappers on Generic XML Trees

Figure 10:
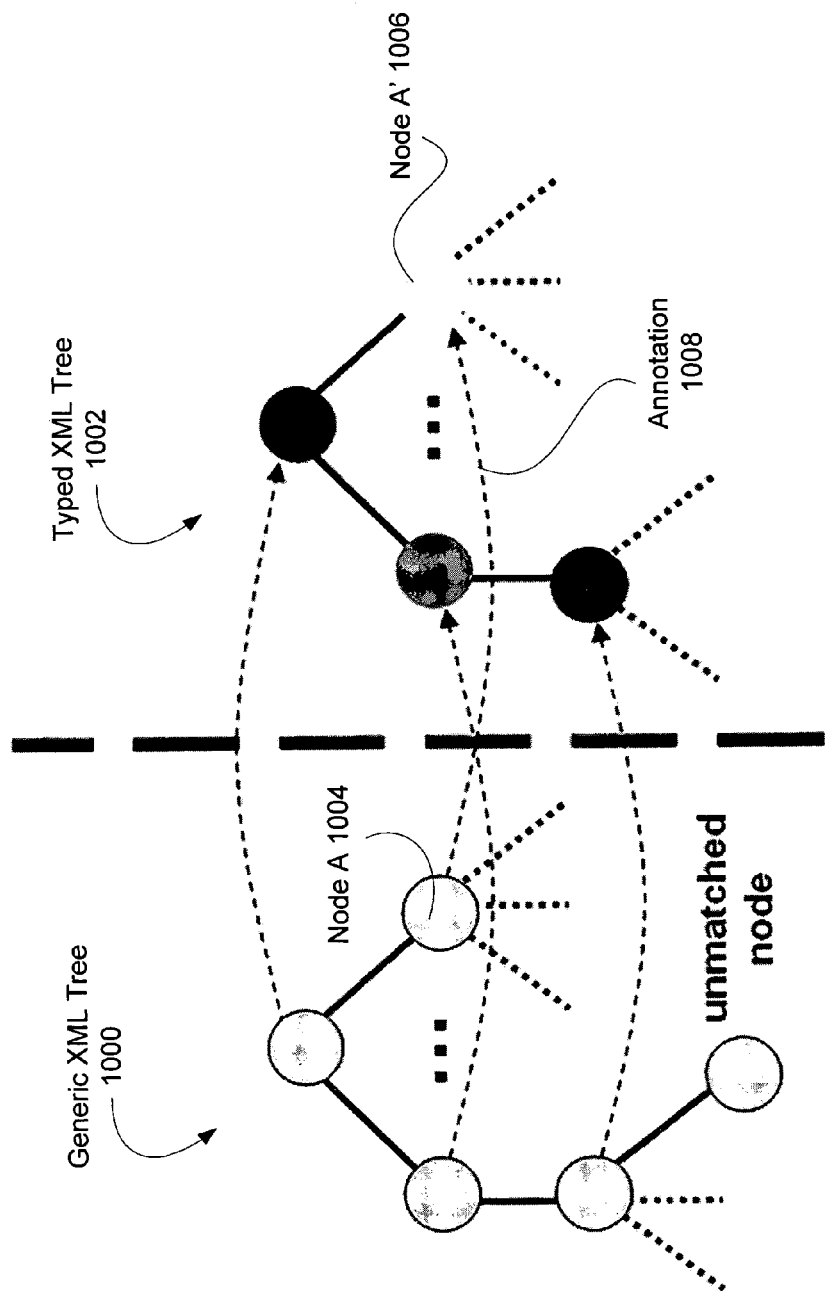
FIG. 10 illustrates that typed nodes can be attached to generic nodes by means of instance annotation.

The subject matter disclosed so far can be applied in a variety of ways and in various contexts. For example, typed nodes can be attached to generic nodes by means of instance annotation. Specifically, FIG. 10 illustrates that nodes on a typed XML tree 1002 can be attached to a generic XML tree 1000 on a per node basis (such that some or all of the nodes in the Generic XML Tree 1000 may have an associated instance on the Typed XML Tree 1002). Thus, for example, node A' 1006 is attached 1008 to node A 1004 and similar logic holds true for the other nodes).

For the sake of concreteness, an XElement tree is assumed, according to the XLinq API as part of the LINQ project (but any other document object model (DOM) like API would be just as suitable). A typical XML tree is homogenously typed—in other words, it is a generic tree and all element nodes on the tree are of the same type. In the case of Xlinq, this type is the class XElement. When such a tree is to be accessed in a more typeful fashion, the types of the various XElement nodes need to be differentiated. Strongly typed wrappers can provide such a mechanism. In general terms, each strongly typed wrapper is another object that sits on top of a homogenous XElement instance, while providing an interface that is specific to the strong wrapper type. In this way, a typed XML tree can reside next to a generic XML tree. As will be shown below, instance annotation also helps to associated strong wrappers and XElement instances.

An XML tree, for instance, may be wrapped by strongly typed srapper classes such as PurchaseOrder, Customer, Address, Product, Item, and so on. A class like Address may comprise of access methods for the constituents of an address, such as a street address, ZIP code, state, and so on. In this setup, typed nodes get attached to the generic nodes whenever the object-oriented XML programmer successfully casts the generic node to a specific type.

Using this setup, any extensibility problems associated with strongly typed wrappers, namely, the need of generic XML technology to anticipate the possibility of strongly typed wrappers, are solved. In other words, at the time of designing the generic XML technology, it may not be clear which wrapper approach should be taken, since many add-on technologies may occur, and it would be disadvantageous for the generic XML technology to commit to a single client of it. This problem is solved by the typed nodes being attached to generic nodes using the above described instance annotation.

FIG. 11 provides one possible code implementation of the various aspects discussed in this section—although it should be noted that this code is merely exemplary and not limiting. Thus, a wrapper class is declared, "XWrapper". At the outset, a link is maintained from the wrapper to the XElement by assigning a null value to XElement. Next, XElements are cast to XWrapper subtypes. And thus, an association between typed nodes (wrappers) and generic nodes (XElements) is created.

The XWrapper class of FIG. 11 may be the base class for all such strong wrapper classes (namely, the mentioned PurchaseOrder, Customer, Address, etc.). The class of FIG. 11 enables not only linking of wrapper instances to XElement instances, but also XElement instances to wrapper instances. In the former case, this capability is trivially enabled because this relationship can be localized in the XWrapper class. In the latter case, instance annotation is used by annotating each XElement instance with its associated XWrapper instance. The annotation-itself can be created as part of a cast operation, AsXWrapper, which takes an XElement instance and returns an XWrapper instance—where this latter instance is either recalled from the annotation or it is created and stored as an annotation, if there was no any suitable annotation yet.

Origin Tracking for CodeDom Trees

Another context in which instance annotation can be used is in CodeDom (Code Document Object Model) Trees. Code Dom is one of the most promising new technologies in the .NET Framework. A popular use of the CodeDom is for developing automatic source code generators. The goal of code generators, of course, is to minimize repetitive coding tasks, and to minimize the number of human-generated source code lines being created. The CodeDom namespaces in the .NET Framework allow developers to create their own code generation utilities. CodeDom uses a tree data structure to represent data and create a storage structure in memory.

By way of example, consumer code for object graphs would often benefit from "origin tracking" such that the producer of the code can be referenced (or additional information about the synthesis can be tracked). For instance, a CodeDom object graph can be constructed from an XML schema (or any other source for the purpose of this discussion). If some latter phase in a staged translation process encounters a problem with the CodeDom object graph, then it is useful to associate this problem with the source or origin from which an offending CodeDom nodes have been derived. Current CodeDom source-code model (SCM) may not be prepared for this sort of tracking. Potentially, any sort of object model may want to provide such an origin tracking capability. And, furthermore, to solve concerns such as what to do if there was a failure to anticipate the origin tracking facility, and its need is encountered later when the object model is already sealed with regard to naïve code changes.

To address these issues, instance annotation provides for (1) CodeDom nodes to be annotated by origins ("producers"), and (2) extension methods or properties to make the attached origins discoverable. This first capability corresponds to the basic instance annotation model discussed in detail above. The second capability demonstrates the merits of combining instance annotation with extension methods and properties. That is, in this latter case, the feature of origin tracking is discoverable through intellisense for CodeDom (wherein intellisense is a form of automated auto-completion and documentation for variable names, functions and methods using metadata reflection—popularized by the MICROSOFT VISUAL STUDIO™ Integrated Development Environment, produced by Microsoft Corporation of Redmond, Wash.). The use of extension methods and properties, and their support through intellisense makes instance annotation most convenient. A code client that uses an extended CodeDom model does not need to bother about the fact that the origins were introduced after the fact.

Figure 12:
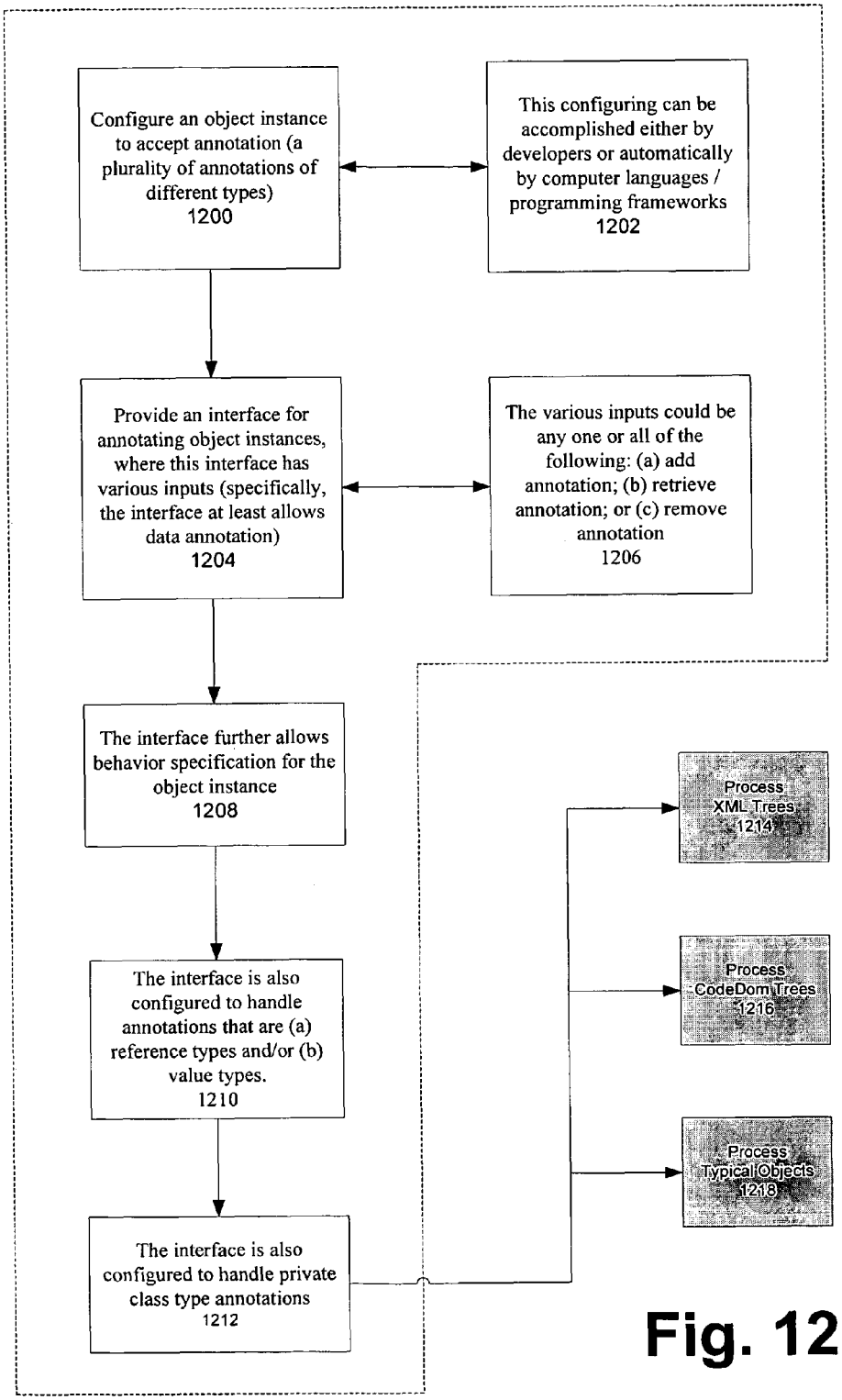
FIG. 12 illustrates a flow chart in block diagram form summarizing various aspects of the presently disclosed subject matter.

Block Diagram Flowchart Summary of Instance Annotation in Object-Oriented Programming The various aspects disclosed herein can be implemented in a myriad of ways. FIG. 12 illustrates in a block diagram flowchart a non-limiting implementation summary. Thus, at block 1200, at block 1200, an object with a plurality of object instances is configured to accept annotations. These annotations can be of different types, and in a preferred embodiment, no two annotation are of the same type per single object instance. Additionally, at block 1202, this configuring can be accomplished either by developers, or, alternatively, by computer languages/programming frameworks.

Next, at block 1204, an interface is provided for annotating object instances, where this interface has various inputs. The interface allows for at least data annotations to the object instances. Moreover, at block 1206 these data annotations can comprise of adding operations, retrieving operations, or removal operations.

Next, at block 1208, the interface is further configured to allow behavior specification (in addition to data specification)—the order here, is not dispositive, as data input at block 1204 could be configured before behavior specification. Furthermore, at block 1210, the interface is also configured to handle annotations that are reference types (which is preferable), but it can also handle value types. And lastly, at block 1212, the interface is also configured to handle private class type annotations (which is preferable), but it can also handle public or other types.

Once the object instances and the interface are configured, they are ready to process various inputs, such as XML trees (block 1214), CodeDom trees (block 1216), or any other kinds of objects (block 1218). In other words, all these inputs can be annotated in their respective fashion—as was discussed above.

Exemplary Computing and Networking Environments for Object Instance Annotation

Figure 13:
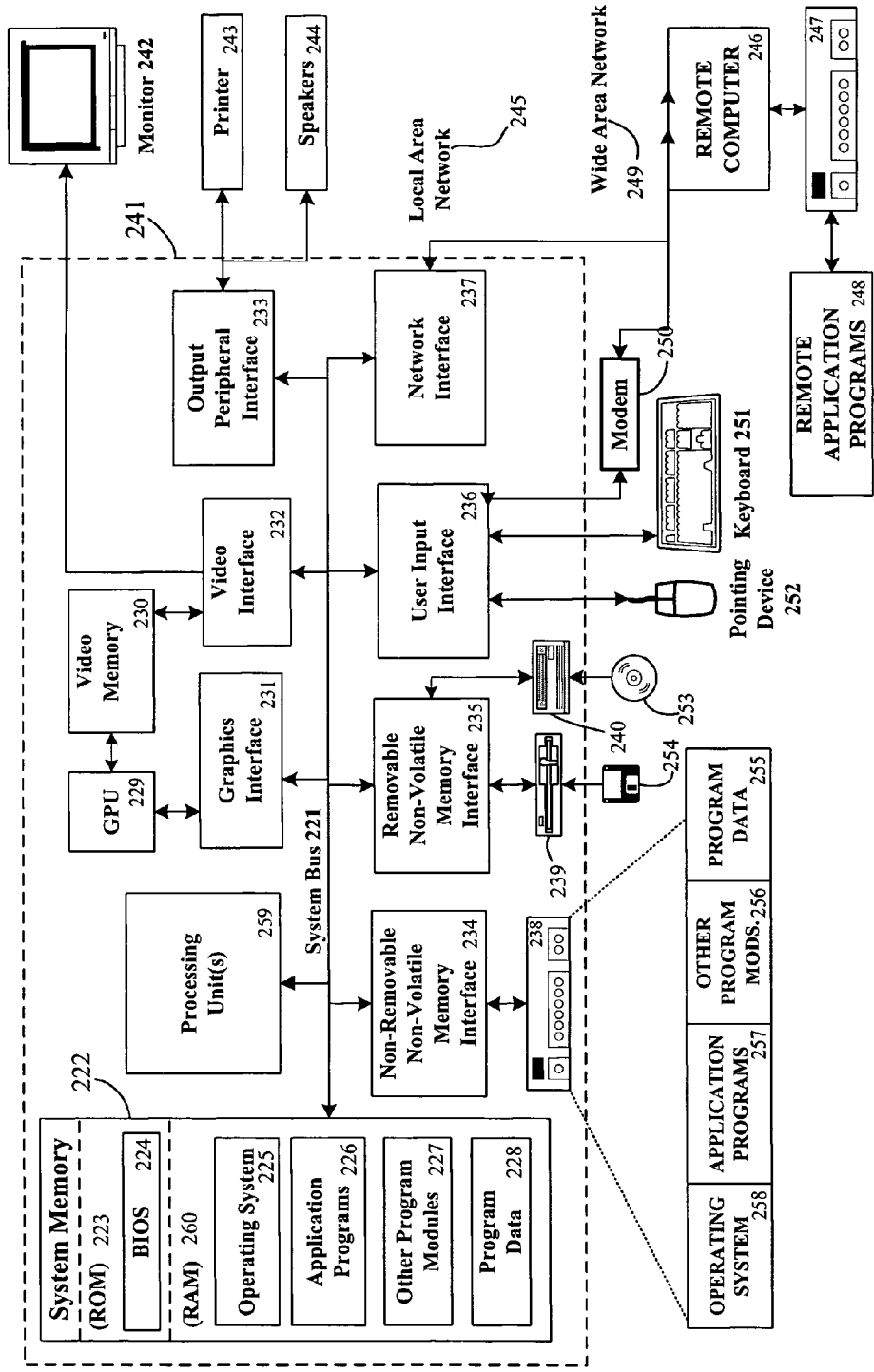
FIG. 13 illustrates a block diagram representing an exemplary computing device suitable for use in conjunction with object instance annotation.

Now Referring to FIG. 13, shown is a block diagram representing an exemplary computing device suitable for use in conjunction with implementing the subject matter disclosed above. For example, the computer executable instructions that carry out the processes and methods for object instance annotation may reside and/or be executed in such a computing environment as shown in FIG. 13. The computing system environment 220 is only one example of a suitable computing environment and is not intended to suggest any limitation as to the scope of use or functionality of the presently disclosed subject matter. Neither should the computing environment 220 be interpreted as having any dependency or requirement relating to any one or combination of components illustrated in the exemplary operating environment 220.

Aspects of the presently disclosed subject matter are operational with numerous other general purpose or special purpose computing system environments or configurations. Examples of well known computing systems, environments, and/or configurations that may be suitable for use with the this subject matter include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Aspects of the presently disclosed subject matter may be implemented in the general context of computer-executable instructions, such as program modules, being executed by a computer. Generally, program modules include routines, programs, objects, components, data structures, etc. that perform particular tasks or implement particular abstract data types. Aspects of the presently disclosed subject matter may also be practiced in distributed computing environments where tasks are performed by remote processing devices that are linked through a communications network. In a distributed computing environment, program modules may be located in both local and remote computer storage media including memory storage devices.

An exemplary system for implementing aspects of the presently disclosed subject matter includes a general purpose computing device in the form of a computer 241. Components of computer 241 may include, but are not limited to, a processing unit 259, a system memory 222, and a system bus 221 that couples various system components including the system memory to the processing unit 259. The system bus 221 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 241 typically includes a variety of computer readable media. Computer readable media can be any available media that can be accessed by computer 241 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 241. Combinations of the any of the above should also be included with the scope of computer readable media.

The system memory 222 includes computer storage media in the form of volatile and/or nonvolatile memory such as read only memory (ROM) 223 and random access memory (RAM) 260. A basic input/output system 224 (BIOS), containing the basic routines that help to transfer information between elements within computer 241, such as during start-up, is typically stored in ROM 223. RAM 260 typically contains data and/or program modules that are immediately accessible to and/or presently being operated on by processing unit 259. By way of example, and not limitation, FIG. 13 illustrates operating system 225, application programs 226, other program modules 227, and program data 228.

The computer 241 may also include other removable/non-removable, volatile/nonvolatile computer storage media. By way of example only, FIG. 13 illustrates a hard disk drive 238 that reads from or writes to non-removable, nonvolatile magnetic media, a magnetic disk drive 239 that reads from or writes to a removable, nonvolatile magnetic disk 254, and an optical disk drive 240 that reads from or writes to a removable, nonvolatile optical disk 253 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 238 is typically connected to the system bus 221 through an non-removable memory interface such as interface 234, and magnetic disk drive 239 and optical disk drive 240 are typically connected to the system bus 221 by a removable memory interface, such as interface 235.

The drives and their associated computer storage media discussed above and illustrated in FIG. 13, provide storage of computer readable instructions, data structures, program modules and other data for the computer 241. In FIG. 13, for example, hard disk drive 238 is illustrated as storing operating system 258, application programs 257, other program modules 256, and program data 255. Note that these components can either be the same as or different from operating system 225, application programs 226, other program modules 227, and program data 228. Operating system 258, application programs 257, other program modules 256, and program data 255 are given different numbers here to illustrate that, at a minimum, they are different copies. A user may enter commands and information into the computer 241 through input devices such as a keyboard 251 and pointing device 252, commonly referred to as a mouse, trackball or touch pad. Other input devices (not shown) may include a microphone, joystick, game pad, satellite dish, scanner, or the like. These and other input devices are often connected to the processing unit 259 through a user input interface 236 that is coupled to the system bus, but may be connected by other interface and bus structures, such as a parallel port, game port or a universal serial bus (USB). A monitor 242 or other type of display device is also connected to the system bus 221 via an interface, such as a video interface 232. In addition to the monitor, computers may also include other peripheral output devices such as speakers 244 and printer 243, which may be connected through a output peripheral interface 233.

The computer 241 may operate in a networked environment using logical connections to one or more remote computers, such as a remote computer 246. The remote computer 246 may be a personal computer, a server, a router, a network PC, a peer device or other common network node, and typically includes many or all of the elements described above relative to the computer 241, although only a memory storage device 247 has been illustrated in FIG. 13. The logical connections depicted in FIG. 13 include a local area network (LAN) 245 and a wide area network (WAN) 249, but may also include other networks. Such networking environments are commonplace in offices, enterprise-wide computer networks, intranets and the Internet.

When used in a LAN networking environment, the computer 241 is connected to the LAN 245 through a network interface or adapter 237. When used in a WAN networking environment, the computer 241 typically includes a modem 250 or other means for establishing communications over the WAN 249, such as the Internet. The modem 250, which may be internal or external, may be connected to the system bus 221 via the user input interface 236, or other appropriate mechanism. In a networked environment, program modules depicted relative to the computer 241, or portions thereof, may be stored in the remote memory storage device. By way of example, and not limitation, FIG. 13 illustrates remote application programs 248 as residing on memory device 247. It will be appreciated that the network connections shown are exemplary and other means of establishing a communications link between the computers may be used.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the presently disclosed subject matter, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the presently disclosed subject matter in the context of one or more stand-alone computer systems, the said subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices might include personal computers, network servers, handheld devices, supercomputers, or computers integrated into other systems such as automobiles and airplanes.

In light of the diverse computing environments that may be built according to the general framework provided in FIG. 13, the systems and methods provided herein cannot be construed as limited in any way to a particular computing architecture. Instead, the presently disclosed subject matter should not be limited to any single embodiment, but rather should be construed in breadth and scope in accordance with the appended claims.

Figure 14:
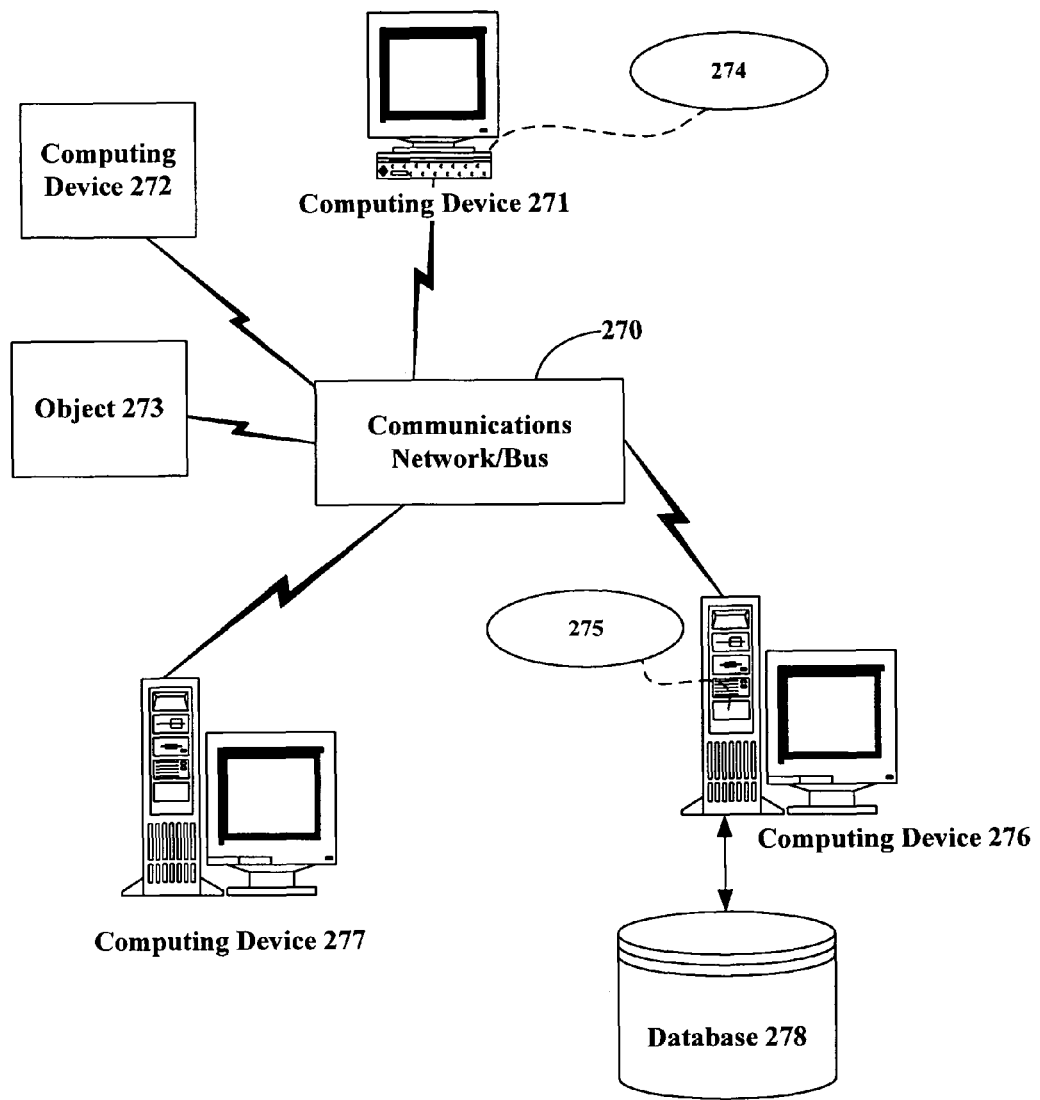
FIG. 14 illustrates an exemplary networked computing environment in which many computerized processes may be implemented to perform the aforementioned object instance annotation in various devices across a network.

Referring next to FIG. 14, shown is an exemplary networked computing environment in which many computerized processes may be implemented to perform the processes described above. For example, parallel computing may be part of such a networked environment with various clients on the network of FIG. 14 using and/or implementing the defining and extracting of a flat list of search properties from a rich structured type. One of ordinary skill in the art can appreciate that networks can connect any computer or other client or server device, or in a distributed computing environment. In this regard, any computer system or environment having any number of processing, memory, or storage units, and any number of applications and processes occurring simultaneously is considered suitable for use in connection with the systems and methods provided.

Distributed computing provides sharing of computer resources and services by exchange between computing devices and systems. These resources and services include the exchange of information, cache storage and disk storage for files. Distributed computing takes advantage of network connectivity, allowing clients to leverage their collective power to benefit the entire enterprise. In this regard, a variety of devices may have applications, objects or resources that may implicate the processes described herein.

FIG. 14 provides a schematic diagram of an exemplary networked or distributed computing environment. The environment comprises computing devices 271, 272, 276, and 277 as well as objects 273, 274, and 275, and database 278. Each of these entities 271, 272, 273, 274, 275, 276, 277 and 278 may comprise or make use of programs, methods, data stores, programmable logic, etc. The entities 271, 272, 273, 274, 275, 276, 277 and 278 may span portions of the same or different devices such as PDAs, audio/video devices, MP3 players, personal computers, etc. Each entity 271, 272, 273, 274, 275, 276, 277 and 278 can communicate with another entity 271, 272, 273, 274, 275, 276, 277 and 278 by way of the communications network 270. In this regard, any entity may be responsible for the maintenance and updating of a database 278 or other storage element.

This network 270 may itself comprise other computing entities that provide services to the system of FIG. 14, and may itself represent multiple interconnected networks. In accordance with an aspect of the presently disclosed subject matter, each entity 271, 272, 273, 274, 275, 276, 277 and 278 may contain discrete functional program modules that might make use of an API, or other object, software, firmware and/or hardware, to request services of one or more of the other entities 271, 272, 273, 274, 275, 276, 277 and 278.

It can also be appreciated that an object, such as 275, may be hosted on another computing device 276. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects and the like.

There are a variety of systems, components, and network configurations that support distributed computing environments. For example, computing systems may be connected together by wired or wireless systems, by local networks or widely distributed networks. Currently, many networks are coupled to the Internet, which provides an infrastructure for widely distributed computing and encompasses many different networks. Any such infrastructures, whether coupled to the Internet or not, may be used in conjunction with the systems and methods provided.

A network infrastructure may enable a host of network topologies such as client/server, peer-to-peer, or hybrid architectures. The "client" is a member of a class or group that uses the services of another class or group to which it is not related. In computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 14, any entity 271, 272, 273, 274, 275, 276, 277 and 278 can be considered a client, a server, or both, depending on the circumstances.

A server is typically, though not necessarily, a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

In light of the diverse computing environments that may be built according to the general framework provided in FIG. 14 and the further diversification that can occur in computing in a network environment such as that of FIG. 14, the systems and methods provided herein cannot be construed as limited in any way to a particular computing architecture or operating system. Instead, the presently disclosed subject matter should not be limited to any single embodiment, but rather should be construed in breadth and scope in accordance with the appended claims.

Other Aspects of Object Instance Annotation

Lastly, while the present disclosure has been described in connection with the preferred aspects, as illustrated in the various figures, it is understood that other similar aspects may be used or modifications and additions may be made to the described aspects for performing the same function of the present disclosure without deviating therefrom.

For example, in various aspects of the disclosure, mechanisms for object instance annotation were disclosed. Based on the present disclosure, one conclusion to bear in mind, per FIG. 15, is that the notion of object instances 1500, as they are used in some aspects herein, are understood to be encapsulated data and behavior, where encapsulation stands for the notion that data is not accessed directly but rather through a behavioral interface. Instance annotation, in this aspect, then, is a means to enable extension in the data dimension 1502. But, given the fact that behavioral extension 1504 can be used to hide the low-level data extension 1502, and that certain behavioral extension 1504 may require data extensions underneath, the capabilities of behavioral extensions 1504 are extended.

In other words, in one aspect of the present subject matter, instance annotation may be simply a form of data extension. Yet, interestingly, one can use existing forms of behavior extension, such as C#3.0 extension methods, to provide access to the data or to operate on the data. Then, one can enable new forms of behavioral extensions when the previous forms could not handle data extensions.

Other equivalent mechanisms to these described aspects are also contemplated by the teachings herein. Therefore, the present disclosure should not be limited to any single aspect, but rather construed in breadth and scope in accordance with the appended claims.

What is claimed:

1. A system for annotating instances of objects, comprising:
   a memory having stored therein computer-executable instructions;
   a computer processor that executes the computer-executable instructions;
   an agent that configures a plurality of object instances of an object to be annotated by annotations of different types, wherein an annotation of at least one object instance is a value of a specified type; and
   an interface configured to provide a set of annotation operations associated with said annotation of the at least one object instance, wherein said set of annotation operations are configured to annotate data associated with said annotation of the at least one object instance using a type corresponding to said specified type, wherein said set of annotation operations comprises a retrieve operation, wherein said retrieve operation is configurable to retrieve annotations according to a weakly typed scenario and a strongly typed scenario, wherein a particular type is used as a search key in the weakly typed scenario, and wherein a generic parameter is used as the search key in the strongly typed scenario.

2. The system according to claim 1, wherein said agent is one of (a) a user of said system and (b) an automatic process associated with a programming language configured for said system.

3. The system according to claim 1, wherein said set of operations comprises of at least one of (a) adding said annotation of the at least one object instance, (b) retrieving said annotation of the at least one object instance, and (c) removing said annotation of the at least one object instance.

4. The system according to claim 1, wherein said annotation of the at least one object instance is one of (a) a reference type and (b) a value type.

5. The system according to claim 1, wherein said specified type is a private class.

6. The system according to claim 1, wherein said object instance is configured to be annotated by one of (a) an XML node and (b) a CodeDom object producer.

7. The system according to claim 1, wherein said at least one object instance is annotated by said annotation of the at least one object instance of said specified type and an additional annotation of a different type.

8. A method for annotating instances of objects, comprising:
configuring a plurality of object instances to be annotated by annotations of different types, wherein an annotation of at least one object instance is a value of a specified type; and
providing an interface configured to provide a set of annotation operations associated with said annotation of the at least one object instance, wherein said set of annotation operations are configured to annotate data associated with said annotation of the at least one object instance using a type corresponding to said specified type, wherein said set of annotation operations comprises a retrieve operation, wherein said retrieve operation is configurable to retrieve annotations according to a weakly typed scenario and a strongly typed scenario, wherein a particular type is used as a search key in the weakly typed scenario, and wherein a generic parameter is used as the search key in the strongly typed scenario.

9. The method according to claim 8, wherein said configuring comprises of one of (a) a user configuring said at least one object and (b) an automatic process associated with a programming language configuring said at least one object.

10. The method according to claim 8, further comprising of configuring said set of operations to one of (a) adding said annotation of the at least one object instance, (b) retrieving said annotation of the at least one object instance, and (c) removing said annotation of the at least one object instance.

11. The method according to claim 8, further comprising of using said annotation of the at least one object instance when said annotation of the at least one object instance is one of (a) a reference type and (b) a value type.

12. The method according to claim 8, further comprising using said specified type when said specified type is a private class.

13. The method according to claim 8, further comprising using said object instance that is configured to be annotated by one of (a) an XML node and (b) a CodeDom object producer.

14. The method according to claim 8, further comprising annotating said annotation of the at least one object instance using said at least one annotation of said specified type and an additional annotation of a different type.

15. A computer readable storage medium bearing computer executable instructions implementable on a physical machine, for annotating instances of objects, comprising:
configuring a plurality of object instances to be annotated by annotations of different types, wherein an annotation of at least one object instance is a value of a specified type; and
providing an interface configured to provide a set of annotation operations associated with said annotation of the at least one object instance, wherein said set of annotation operations are configured to annotate data associated with said annotation of the at least one object instance using a type corresponding to said specified type, wherein said set of annotation operations comprises a retrieve operation, wherein said retrieve operation is configurable to retrieve annotations according to a weakly typed scenario and a strongly typed scenario, wherein a particular type is used as a search key in the weakly typed scenario, and wherein a generic parameter is used as the search key in the strongly typed scenario.

16. The computer readable storage medium according to claim 15, wherein said configuring comprises of one of (a) a user configuring said at least one object and (b) an automatic process associated with a programming language configuring said at least one object.

17. The computer readable storage medium according to claim 15, further comprising of configuring said set of operations to one of (a) adding said annotation of the at least one object instance, (b) retrieving said annotation of the at least one object instance, and (c) removing said annotation of the at least one object instance.

18. The computer readable storage medium according to claim 15, further comprising using said specified type when said specified type is a private class.

19. The computer readable storage medium according to claim 15, further comprising using said object instance that is configured to be annotated by one of (a) an XML node and (b) a CodeDom object producer.

* * * * *